(12) United States Patent
Bernerstätter et al.

(10) Patent No.: US 12,415,554 B2
(45) Date of Patent: Sep. 16, 2025

(54) METHOD FOR MONITORING RAILWAY POINTS AND POINTS MACHINE

(71) Applicants: VOESTALPINE SIGNALING AUSTRIA GMBH, Zeltweg (AT); INDTACT GMBH, Würzburg (DE)

(72) Inventors: Robert Bernerstätter, Zeltweg (AT); Raino Petričević, Würzburg (DE); Clemens Launer, Würzburg (DE)

(73) Assignees: VOESTALI ANALING AUSTRIA GMBH, Zeltweg (AT); INDTACT GMBH, Würzburg (DE)

( * ) Notice: Subject to any disclaimer, the term of this patent is extended or adjusted under 35 U.S.C. 154(b) by 0 days.

(21) Appl. No.: 19/113,122

(22) PCT Filed: Sep. 19, 2023

(86) PCT No.: PCT/IB2023/059267
§ 371 (c)(1),
(2) Date: Mar. 19, 2025

(87) PCT Pub. No.: WO2024/062380
PCT Pub. Date: Mar. 28, 2024

(65) Prior Publication Data
US 2025/0256747 A1 Aug. 14, 2025

(30) Foreign Application Priority Data
Sep. 20, 2022 (EP) .................................... 22020451

(51) Int. Cl.
*B61L 27/53* (2022.01)
*B61L 1/20* (2006.01)
(Continued)

(52) U.S. Cl.
CPC ................. *B61L 27/53* (2022.01); *B61L 1/20* (2013.01); *B61L 5/06* (2013.01); *B61L 23/04* (2013.01);
(Continued)

(58) Field of Classification Search
CPC .... B61L 27/53; B61L 5/06; B61L 1/20; B61L 5/02; B61L 23/04; G01H 11/08; G01L 1/16; E01B 7/00
See application file for complete search history.

(56) References Cited

U.S. PATENT DOCUMENTS

2015/0028164 A1* 1/2015 Mariuzza, Jr ....... G01M 99/008
  246/253
2016/0202113 A1* 7/2016 Petricevic .............. G01H 11/08
  73/584

FOREIGN PATENT DOCUMENTS

CN 113635942 A * 11/2021 ............... B61L 23/04
DE 19858937 A1 * 6/2000 ............... B61K 9/12
(Continued)

OTHER PUBLICATIONS

International Search Report and Written Opinion received in PCT/IB2023/059267 dated Dec. 8, 2023, 18 pages.
(Continued)

*Primary Examiner* — Zachary L Kuhfuss
(74) *Attorney, Agent, or Firm* — Liang & Hennessey LLP; Brian Hennessey

(57) ABSTRACT

Method for monitoring a track switch with a switch drive, wherein the switch drive includes a housing, a switch setting motor arranged in the housing and a switch rod extending out of the housing for coupling to a track switch. The method includes providing a piezoelectric sensor arranged on the housing and detecting measurement signals of the piezoelectric sensor during a switching operation of the switch drive. Periodic components of the measurement signal are at (Continued)

least partially filtered out in order to obtain signal components representative of a non-periodic change in the strain of the housing. The method also includes evaluating a temporal progression of the signal components representative of the non-periodic change in strain in order to identify deviations from a nominal state.

24 Claims, 3 Drawing Sheets

(51) Int. Cl.
*B61L 5/06* (2006.01)
*B61L 23/04* (2006.01)
*E01B 7/00* (2006.01)
*G01L 1/16* (2006.01)
*B61L 5/02* (2006.01)

(52) U.S. Cl.
CPC ............... *E01B 7/00* (2013.01); *G01L 1/16* (2013.01); *B61L 5/02* (2013.01)

(56) References Cited

FOREIGN PATENT DOCUMENTS

| | | | |
|---|---|---|---|
| DE | 102017217414 | A1 | 4/2019 |
| EP | 3269615 | A1 | 1/2018 |
| EP | 3885234 | A1 | 9/2021 |
| WO | 2017197423 | A1 | 11/2017 |
| WO | 2019063263 | A1 | 4/2019 |

OTHER PUBLICATIONS

Office Action in European Application No. 22020451.5, mailed Mar. 10, 2023, 9 pages.

\* cited by examiner

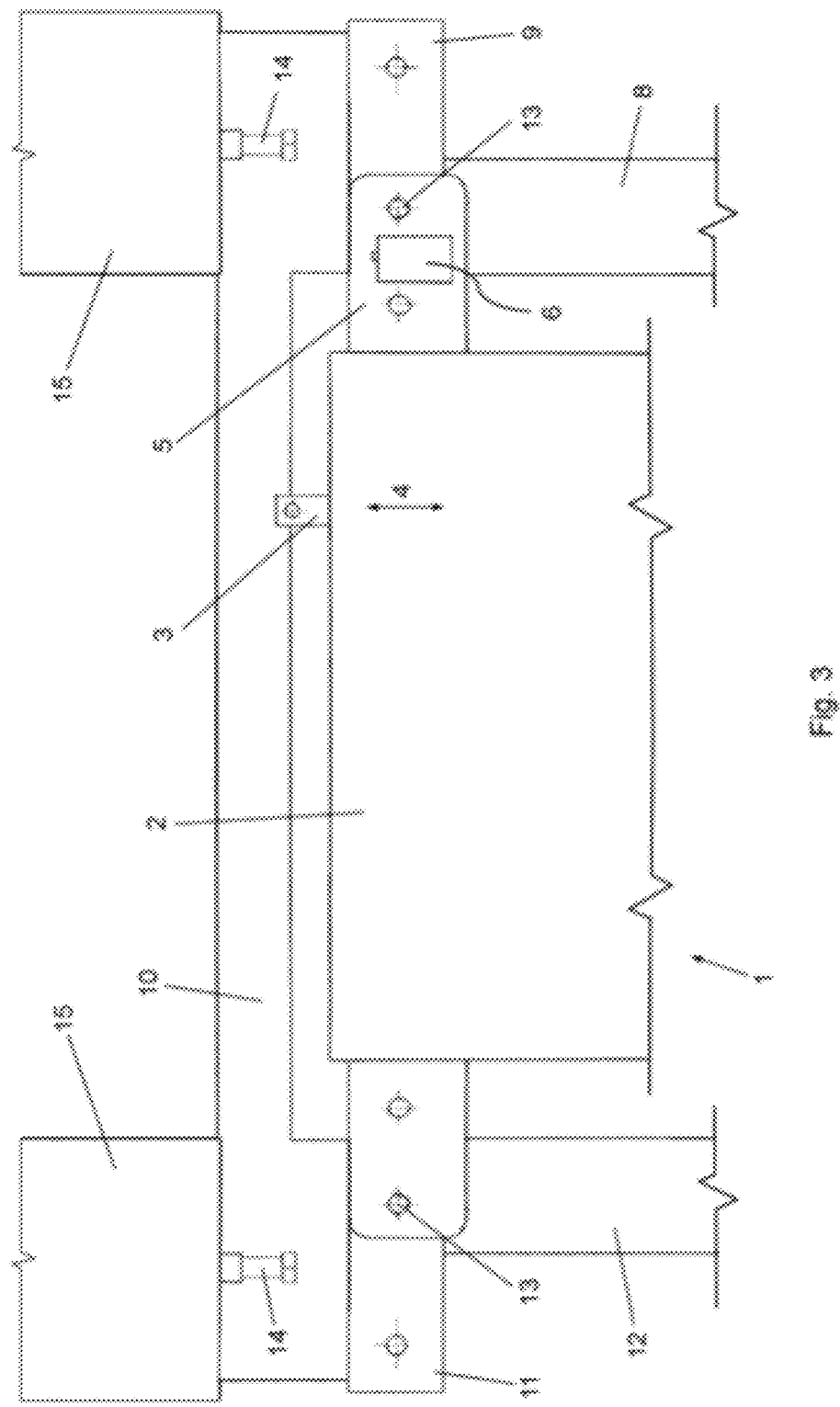

METHOD FOR MONITORING RAILWAY POINTS AND POINTS MACHINE

CROSS-REFERENCE TO RELATED APPLICATIONS

The present application is a national phase application of PCT Application No. PCT/IB2023/059267, filed Sep. 19, 2023, entitled "METHOD FOR MONITORING RAILWAY POINTS AND POINTS MACHINE", which claims the benefit of European Patent Application No. 22020451.5, filed Sep. 20, 2022, each of which is incorporated by reference in its entirety.

BACKGROUND OF THE INVENTION

1. Field of the Invention

The invention relates to a method for monitoring a track switch with a switch drive, wherein the switch drive comprises a housing, a switch setting motor arranged in the housing and a switch rod extending out of the housing for coupling to a track switch.

Furthermore, the invention relates to a switch drive for carrying out the method according to the invention.

2. Description of the Related Art

Switch diagnostic systems enable rail network operators to detect imminent damage to various components of a switch, in particular the switch drive, at an early stage, thereby avoiding switch failures and optimizing maintenance processes. Switch failures can result from mechanical, environmental, hydraulic or electrical problems and often lead to long-term outages of the affected track section.

Various methods have been proposed for remote monitoring of switch drives, which aim to monitor a changeover of the switch and to detect a state of wear from the temporal progression of the measured variable detected during switching operation and, if necessary, from a comparison of the progression with setpoint values.

Other known methods use sensors in the switch tower that monitor the current flow to the switch setting motors of the switch drive. For each changeover process, the current flow curves are measured and sent to an evaluation unit, where the data is analyzed using parameters and user rules set individually for each switch. The advantage of measuring the current flow is that monitoring can be carried out from the switch tower, so there is no need to intervene in the switch drive. The disadvantage, however, is that current flow curves only allow general statements to be made about the condition of the switch, including the switch drive, without being able to make a remote diagnosis regarding the cause of the fault.

A more precise localization of signs of wear or faulty conditions is made possible by the arrangement of sensors on various components of the switch drive itself, such as strain measurement sensors on switch rods or force measuring bolts as a connecting element between a switch rod and the drive rod of the switch, with which a measurement of the switching force is made possible. Such sensors require cabling on moving external parts of the switch drive and are therefore prone to errors and complex to install.

To overcome these disadvantages, monitoring systems have already been proposed in which the sensors can be arranged on the stationary housing of the switch drive instead of on moving parts. For example, WO 2019/063263 A1 discloses a method for analyzing the switch drive of a track switch with a sensor for measuring sound waves during a switching operation of the switch drive, wherein an switching force of an switching force coupling of the switch drive is determined on the basis of the detected sound waves. The sensor can be designed as a piezoelectric sensor or as an acoustic surface wave sensor. A disadvantage of the detection of sound waves is the difficulty in associating anomalies in the sound signal with a specific source of error. This is usually due to interference frequencies that cannot be easily filtered out. The occurrence of unforeseen interference frequencies that happen to lie in a signal range associated with a particular error source or switching force, or that can distort this signal range, also poses a problem. Determining the switching force via sound waves also requires regular calibration, as the measured values are otherwise not stable over the long term and therefore not reliable.

Another possibility is disclosed in EP 3269615 A1, in which a fiber optic sensor is attached to the housing of the switch drive in order to detect a parameter, such as strain, which indicates the condition of the switch drive. However, fiber optic sensors are only suitable for use under the harsh conditions in the area of a switch drive to a limited extent. Fiber optic sensors require a so-called interrogator, which is expensive and cannot be integrated into a switch drive due to its size. In practice, an interrogator is therefore housed separately for several measuring points at a central location outside the switch drive housing and connected to the individual fiber optic sensors via fiber optic cables. The sensitive fiber optic cables must then be laid over longer distances to protect them from mechanical influences, which also shows considerable effort. Particularly with the necessary accuracy and reproducibility of the measurements in this field of application, fiber optic cables with their couplings must be pre-assembled in the required lengths under workshop conditions. Retrofitting to switch drives that have already been installed is therefore particularly difficult and expensive.

Another disadvantage of fiber optic sensors is their lower sensitivity in detecting deformation amplitudes. When components fail or tear off, so-called "bursts" occur, which cannot be sufficiently resolved by a fiber optic sensor. There are also fractions of bearing noises (e.g. "pitting") and friction noises (e.g. during degreasing) that are not covered by fiber optic sensors. Another disadvantage of fiber optic sensors is their impairment due to the change in strain with the change in temperature. Beyond a certain calibrated temperature, an offset must be constantly compensated. Compensation is made more difficult by the fact that the influence of temperature can easily be in the order of magnitude of the measured values or even higher.

SUMMARY OF THE INVENTION

The present invention therefore aims at enabling an improved monitoring of switches, with which the above mentioned disadvantages can be overcome. In particular, the invention aims to enable monitoring of the switch without the need for external components to be separately housed, while minimizing the extent of structural intervention in existing components of a switch and also ensuring simple retrofitting of existing switches. Furthermore, the monitoring system should be able to identify the causes of faults and recommend targeted maintenance measures.

To solve these tasks, a method for monitoring a track switch with a switch drive is provided according to a first aspect of the invention, comprising: providing a piezoelectric sensor arranged on the housing, detecting measurement signals of the piezoelectric sensor preferably during a switching operation of the switch drive, wherein periodic components of the measurement signal are at least partially filtered out in order to obtain signal components representative of a non-periodic change in the strain of the housing, and evaluating a temporal progression of the measurement signals in order to identify deviations from a nominal state.

The invention is thus based on the idea of using a piezoelectric sensor and detection suitable measured values that can be used for switch diagnostics, whereby it has been found that the arrangement of such a sensor on the housing of the switch drive is sufficient to obtain relevant results. In particular, it was found that a piezoelectric sensor can be used to detect non-periodic changes in the strain of the housing, whereby the strain can be used as a measure of the mechanical load on the housing and from this the condition of the switch can be inferred.

Non-periodic changes in the strain of the housing comprise in particular slow or quasi-static changes in strain caused by forces acting on the housing of the switch drive during the switching process of the switch. As the housing acts as an abutment for the parts of the switch, including the switch drive, that are loaded during a changeover process, a load leads to a corresponding stress and consequently to a deformation or strain of certain areas of the housing. The deformation of the housing occurs particularly in housing areas that lie in the force transmission path. If the superficial strain behavior of the housing at a certain point as a function of a load is known, the rough running of the switch can be deduced by measuring the strain at the certain point.

The piezoelectric sensor is therefore arranged at a point on the housing that lies in the force transmission path of a force component that usually acts on the housing in a variable manner. In particular, the piezoelectric sensor can be arranged at a point at which the strain of the housing resulting from the acting force is at least 0.1 μeps (μm/m).

For example, the piezoelectric sensor can be arranged as close as possible to an axially fixed spindle bearing of an electric motor-driven spindle drive for adjusting a switch rod and possibly as close as possible to the screw connection of the switch drive housing to the switch. In the case of hydraulically driven switches, the piezoelectric sensor can be arranged as close as possible to the electrohydraulic mounting point of the drive module.

The housing of the switch drive can consist of several housing components. Preferably, the housing comprises a first housing component at least partially surrounding the switch setting motor and a second, plate-like housing component rigidly connected thereto, with which the switch drive is attached to the track switch, such as e.g. a sleeper. The second housing component can be designed as a mounting plate, such as e.g. a mounting plate or adapter plate, which comprises suitable through-holes for fastening bolts with which the switch drive is screwed to the switch, e.g. to a sleeper.

The piezoelectric sensor can be arranged on the first housing component or on the second housing component. In the case of arrangement on the second housing component, the sensor can preferably be arranged as close as possible to the screw connection of the switch drive housing to the switch or, for example, at the level of the insertion of the switch rod.

Preferably, the piezoelectric sensor is oriented along the principal direction of strain at the location of the housing.

Preferably, the piezoelectric sensor element or the piezoelectric sensor is coupled to the housing surface in a friction-locked and/or material-locked manner, so that the strain of the housing or the housing surface is transferred proportionally to the piezoelectric sensor. In the case of a materially bonded connection, an adhesive connection is particularly advantageous.

One of the advantages of using a piezoelectric sensor is its extremely high measuring sensitivity. Although the measurement results of a piezoelectric sensor are temperature-dependent, this is only to a small extent. In contrast to a fiber optic sensor, the temperature sensitivity does not cause an offset drift when measuring strain, but rather, for example, an amplification or attenuation of the measured amplitude of an oscillation. A piezoelectric sensor is therefore easier to evaluate and more reliable in terms of accuracy when temperatures fluctuate greatly in practice. The temperature compensation of the measured values is software-based and based on the temperature characteristic curve of the sensor.

A piezoelectric sensor behaves similarly robustly when the coupling properties to the substrate change, which is important for reliable sensor measurements with as few interventions as possible over many years. A changing bias resulting from the coupling (e.g. chemical-mechanical change in a bond) has no effect as an offset drift, similar to thermal strain.

The piezoelectric sensor can be arranged on the outside or inner side of the housing. The arrangement on the inner side of the housing is advantageous, as this ensures that the sensor is protected from external environmental influences or the effects of mechanical force or violence. Due to the small design of piezoelectric sensors, such a sensor can be placed on the inner side without affecting other components. Any electromagnetic interference from railroad operations can be kept out at low cost and with low material costs by means of shielding. This also enables pre-processing or complete evaluation of the measurement signals inside a switch drive.

The sensor can be easily retrofitted both on the outside and on the inner side of the housing, as there is no coupling to moving components and little cabling is required. Easy replacement is also guaranteed in the event of damage to the sensor.

Compared to fiber optic sensors, a piezoelectric sensor does not require cabling with an external evaluation module. Instead, the measurement signals can be evaluated using a small electronic circuit, which can be arranged in the immediate vicinity of the sensor on or in the housing of the switch drive or which can be combined with the piezoelectric sensor to form an integrated unit.

Piezoelectric sensors are able to convert the smallest deformations or changes in strain into electrical signals, so that changes in strain induced by structure-borne sound, for example, can also be detected. The signal output by the sensor can therefore comprise high-frequency components and low-frequency components. However, piezoelectric sensors are less suitable for use in purely static measurements. A static force leads to a defined amount of charge on the surface of the piezoelectric material. If this charge is measured with a commercially available voltage device, for example, charges are continuously lost due to the non-infinitely high input impedance, which leads to a continuous signal drop. Very slow changes in strain therefore do not lead to an accumulation of the charge quantities, so that no signal representing the overall change is obtained. When measuring periodic, especially high-frequency strain changes, this effect is less pronounced or of secondary importance.

In order to obtain signal components representing the non-periodic change in strain within the scope of the invention, the procedure is such that periodic components of the measurement signal are at least partially filtered out. In this context, a preferred embodiment provides that the signal components representing the non-periodic change in strain are obtained by low-pass filtering, whereby the low-pass filtering is carried out with a cutoff frequency at which periodic signal components of the piezoelectric sensor corresponding to a structure-borne sound and preferably comprising a frequency of >100 Hz are at least partially removed or attenuated. The low-pass filtering can be implemented using conventional analogue and/or digital signal processing methods.

After the filtering of high-frequency signal components, a signal component remains which shows a quasi-static shift of the high-frequency signal component and is representative of a deformation of the housing due to the mechanical, non-oscillating load acting on the housing during the changeover process of the switch. In order to counteract the effect that slowly occurring strain changes are not output as a cumulative signal by a piezoelectric sensor due to the rapid charge loss, a preferred embodiment of the invention provides that the signal components representing the non-periodic change in strain are amplified by means of a charge amplifier.

According to a particularly preferred embodiment of the invention, not only the non-periodic quasi-static signal component is used for monitoring the switch, but also the periodic signal components corresponding to a structure-borne sound. In this respect, it is preferably provided that additional signal components of the piezoelectric sensor are detected and evaluated, which represent structure-borne sound waves. In the context of the invention, structure-borne sound waves are understood to be mechanical vibrations (e.g. >100 Hz) that can propagate from a sound source over longer distances through mechanically coupled components and can be picked up via the surface of the housing. The sound source can be located in the housing itself or be formed by a component of the switch located outside the housing, such as a switch rod, a switch rail, a loosened fastening element, a roller device, a switch lock, a switch device or the like, in particular by a component acoustically coupled to the housing of the switch drive. The structure-borne sound can be caused by vibrations of a component of the switch and the vibrations can in turn be caused by frictional contact between components. Alternatively, vibrations as well as deformations can be caused by a train passing over the switch and can also be evaluated. As other excitations act on the components of the switch or the switch drive, sources of error can also be stimulated that would not be sufficiently detected if the switch were only operated in the changeover mode.

Structure-borne sound waves with a bandwidth of f (e.g. 20 kHz) can only be detected with a sampling rate of at least 2f (i.e. at least 40 kHz in the example).

A suitable analysis or evaluation of the signal components representing the structure-borne sound, in particular in combination with the non-periodic quasi-static signal component, allows the identification of characteristic features of the vibration or the corresponding structure-borne sound, which in turn allows conclusions to be drawn about a possible source of the vibrations. This makes it easier to locate sources of faults and to differentiate between the causes of faults. In a preferred embodiment, a combined evaluation of the signal components representing the structure-borne sound and the non-periodic quasi-static signal components, in particular the respective signals detected during the changeover operation and during a train crossing, enables the detection of a source of error that could not have been clearly detected either in the changeover operation alone or during the crossing alone.

With regard to the detection of signal components representing structure-borne sound, the advantage of piezoelectric sensors is that such sensors comprise a measurement sensitivity that is one to two orders of magnitude higher than that of fiber optic sensors. This means that a piezoelectric sensor can detect a vibration with an amplitude 10 to 100 times smaller than a fiber optic sensor. A piezoelectric sensor is therefore particularly suitable for measuring structure-borne sound waves. In addition, a piezoelectric sensor has a higher bandwidth of up to several MHz. Overall, a piezoelectric sensor therefore achieves a signal with a significantly higher information content.

A high measurement sensitivity is important for a meaningful analysis of the switch or its components to be detected by the switch drive housing during a train crossing, especially if the acoustic coupling between the switch and the switch drive housing is only weak in the end position of the switch drive.

A high measuring sensitivity is also useful for detecting so-called "bursts", a high-frequency form of structure-borne sound in the MHz range that occurs when components fail or tear off, which cannot be sufficiently resolved by a fiber-optic sensor. The same applies to frequency components of bearing noises (e.g. "pitting") and friction noises (e.g. during degreasing), which are well covered by the frequency band of a piezoelectric sensor.

The detection and/or recording of the signal components representing the non-periodic changes in the strain of the housing and the signal components representing the structure-borne sound can be performed sequentially, individually or simultaneously.

The detection and/or recording of the signal components representing the non-periodic changes in the strain of the housing and/or the signal components representing the structure-borne sound preferably takes place during the switching operation, i.e. during the changeover of the switches. Alternatively, the method according to the invention can also be used to detect the effects of passing trains outside the setting process. For example, in addition to the course of a mechanical load with one and the same piezoelectric sensor, train passages can also be detected and classified on the basis of the vibration signals and/or switch position.

A further development of the invention provides that, in addition to the piezoelectric sensor mentioned above, at least one further piezoelectric sensor is arranged on the housing, the measurement signals of which can be detected and evaluated in the same way as described above in relation to the one piezoelectric sensor. The arrangement of two or more piezoelectric sensors allows for redundancy in the event of a sensor failure and can also take into account the fact that strains in different areas of the housing are different. With several sensors, a more complete detection of the relative (i.e. not absolute) load or deformation state of the housing and thus of the switch is possible.

As already mentioned, the status diagnosis of the switch comprises an evaluation of a temporal progression of the signal components representative of the non-periodic change in strain in order to identify deviations from a nominal state. This is based on the realization that the progression of the deformation signal at a fixed position of the housing during repetitive switching processes is characteristic of a switching process like a fingerprint. Accordingly, changes in the switching process result in a change in the amplitude and progression of the deformation signal.

Such changes in the switching process can be caused by fatigue, wear, loosening, degreasing, defects (e.g. in the control electronics), current fluctuations and/or external influences. It is sufficient to monitor the relative change of the deformation signal with respect to a reference signal curve. Such a reference signal can, for example, be recorded and stored in the initial or new state of the switch drive. Similarly, a reference signal can be recorded after initial commissioning, after an inspection or after maintenance. Calibration is not necessary, as only changes or qualitative signatures in relation to the reference state or the reference signature are important.

The deformation signals obtained according to the invention together with the reference measurement thus contain all the information required to assess the switching behavior and condition of switch setting drives and switch components.

In this context, a preferred embodiment of the invention provides that an amplitude of the temporal progression of the signal components representing the non-periodic change in strain is determined and compared with a setpoint value, whereby the temporal progression can be divided into sub-ranges typical of the switch changeover process in order to be able to better match error modes.

According to a preferred design, a measure of the rough-running of the switch is determined from the signal components representing the non-periodic change in strain. The stiffness can be specified here as an absolute or relative measure and shows the resistance that the moving components of the switch oppose to the drive during the change-over process. The rough-running thus correlates with the counterforce acting on the switch drive during the change-over process. In contrast to an (absolute) counterforce that can only be measured with calibrated sensor technology, which is measured in Newtons and can only be quantified with the aforementioned additional effort on the basis of the strain detected by the piezoelectric sensor, the rough-running can be correlated as a relative measure, for example with a change in the changeover resistance in relation to at least one output value or an output curve.

Another preferred embodiment provides that the temporal progression of the signal components representing the non-periodic change in strain is recorded during a plurality of switching operations and a maintenance requirement of the switch, such as the switch drive, is determined from a comparison of the recorded progressions.

As already mentioned, measured values of the piezoelectric sensor can fluctuate depending on the temperature. It is therefore preferable that measured temperature values of a temperature sensor are detected, which are representative of the temperature of the housing in the area of the piezoelectric sensor, and that the measured temperature values are used to compensate for temperature-dependent changes in the measurement signals of the piezoelectric sensor.

According to a second aspect of the invention, a switch drive is provided with which the method according to the first aspect of the invention can be carried out, and which comprises a housing, a switch setting motor arranged in the housing, a switch rod extending out of the housing for coupling to a track switch, a piezoelectric sensor arranged on the housing and an evaluation unit to which the measurement signals of the piezoelectric sensor are fed, wherein the evaluation unit is designed to detect and record measurement signals from the piezoelectric sensor, preferably during a switching operation of the switch drive, wherein periodic components of the measurement signal are at least partially filtered out in order to obtain signal components representative of a non-periodic change in the strain of the housing, and the evaluation unit is designed to evaluate a temporal progression of the signal components representative of the non-periodic change in the strain in order to identify deviations from a nominal state.

As already explained in connection with the method according to the invention, the piezoelectric sensor can be arranged on an inner side of the housing.

Preferably, a low-pass filter with a cutoff frequency is provided at which periodic signal components of the piezoelectric sensor corresponding to a structure-borne sound, preferably comprising a frequency of >100 Hz, are at least partially removed or attenuated in order to obtain the signal components representing the non-periodic change in strain.

Preferably, a charge amplifier is provided which amplifies the signal components representing the non-periodic change in strain.

Preferably, the evaluation unit is designed to detect the signal components representing the non-periodic change in strain by determining quasi-static components of the sensor pickup.

Preferably, the evaluation unit is designed to determine an amplitude of the temporal progression of the signal components representing the non-periodic change in strain and to compare it with a setpoint value, whereby the temporal progression can be divided into sub-ranges typical for the switch changeover process in order to be able to better assign error modes.

Preferably, the evaluation unit is designed to determine a measure of the rough-running of the switch from the signal components representing the non-periodic change in strain.

Preferably, the evaluation unit is designed to record the temporal progression of the signal components representative of the non-periodic change in strain during a plurality of switching operations and to determine a maintenance requirement of the switch, such as the switch drive, from a comparison of the recorded progressions.

Preferably, the evaluation unit is designed to additionally detect and evaluate signal components of the piezoelectric sensor that represent structure-borne sound waves.

Preferably, a temperature sensor is provided to detect the temperature of the housing in the area of the piezoelectric sensor, the measured temperature values of which are fed to the evaluation unit to compensate for temperature-dependent changes in the measurement signals of the piezoelectric sensor.

BRIEF DESCRIPTION OF THE DRAWINGS

The invention is explained in more detail below with reference to embodiments shown schematically in the drawing. In this, FIG. 2 shows a first embodiment of a switch drive with a piezoelectric sensor and FIG. 3 shows a second embodiment of a switch drive with a piezoelectric sensor.

DETAILED DESCRIPTION

Figure 1:
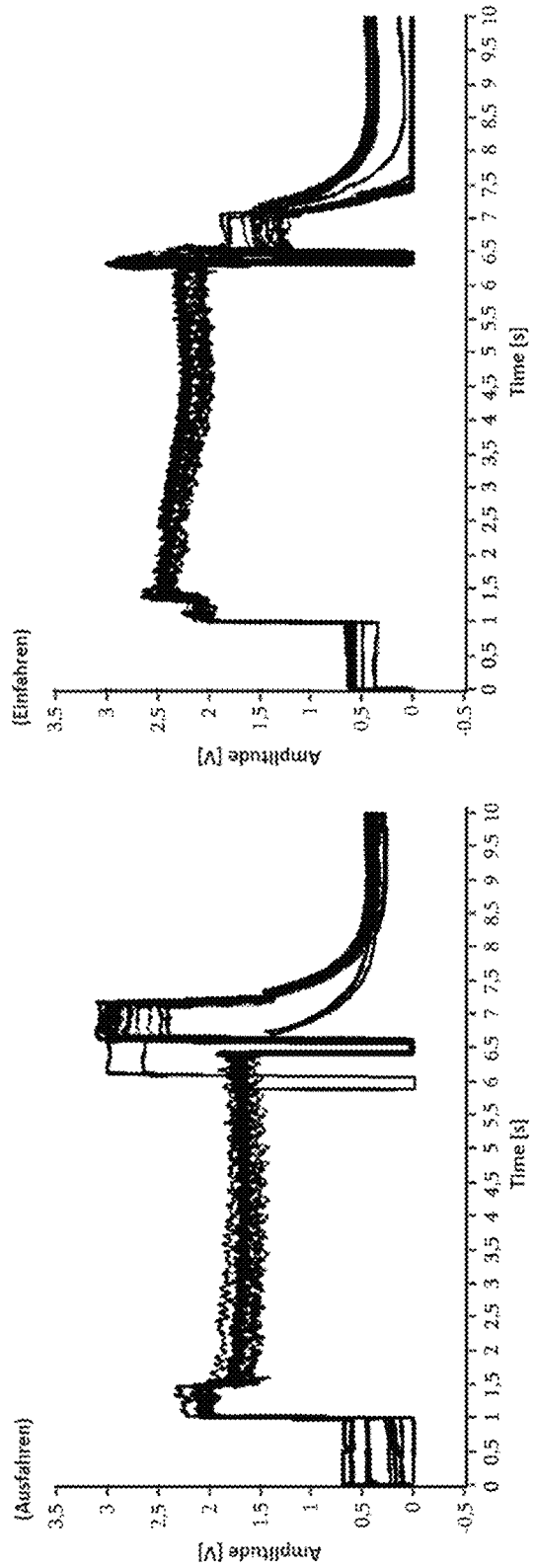
FIG. 1 shows the results of strain measurements.

FIG. 1 shows several curves corresponding to strains measured by a piezoelectric sensor on the housing of a switch drive during the changeover processes. The curve shown was obtained by filtering out high-frequency signal components of the piezoelectric sensor so that only the quasi-static components not induced by structure-borne sound remain. Progressions from a large number of changeover processes are shown one above the other.

The set of curves shown on the left in FIG. 1 corresponds to the changeover process in which the tongue rail is moved in one direction, and the set of curves shown on the right in FIG. 1 corresponds to the changeover process in which the tongue rail is moved in the opposite direction. Due to an optional magnitude formation step in the evaluation unit, the sensor signal deflections are shown as positive regardless of the direction of the changeover process for better comparability. It can be seen that the piezoelectric sensor arranged on the housing of the switch drive can be used to detect the typical load curve, which is characterized in the case of a fault-free switch by, among other things, a switch-on peak, a horizontal curve during the changeover of the switch and a steep drop after locking.

Figure 2:
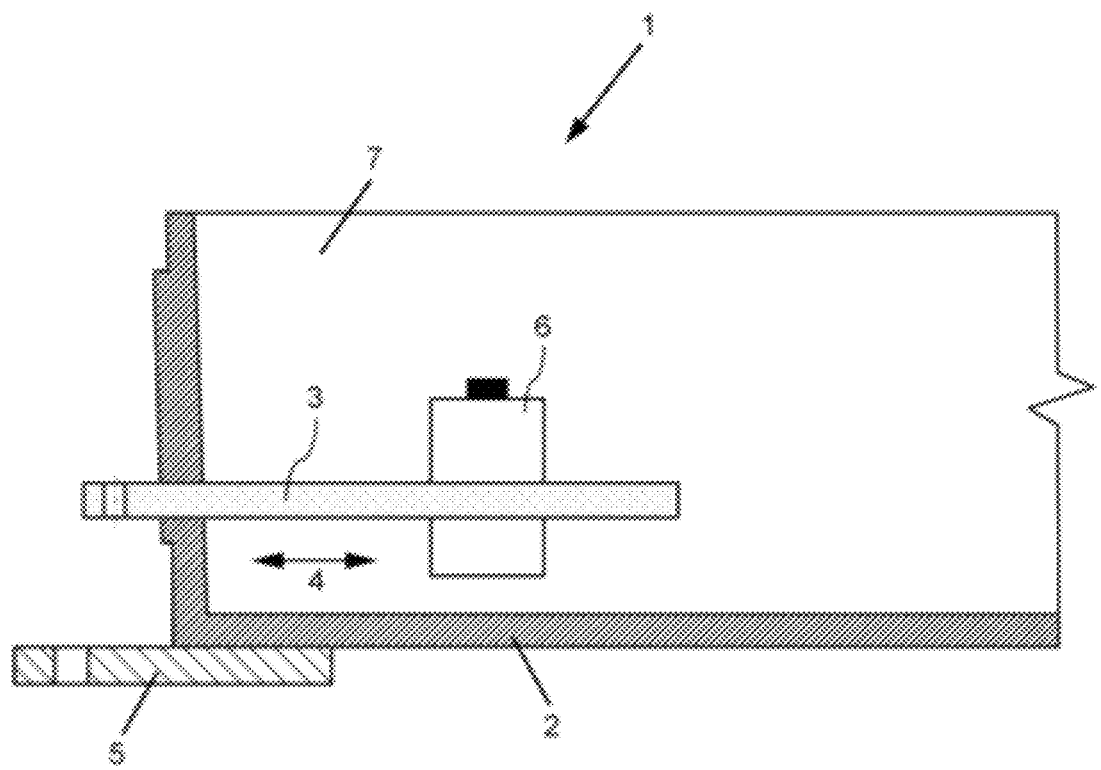

FIG. 2 shows a partial view of a switch drive 1 in cross-section. The switch drive 1 comprises a housing 2 in which a switch setting motor (not shown) is arranged, which drives a switch rod 3 extending out of the housing 2 for coupling to a track switch in the direction of the double arrow 4. The housing 2 also comprises a mounting plate 5 with which the switch drive 1 can be screwed onto a sleeper (not shown) via a drive bearing. A piezoelectric sensor 6 is attached to the inner side of the housing 2, namely to the side wall 7 of the housing 2, in order to detect changes in the strain of the housing 2.

FIG. 3 shows a partial view of a switch drive 1 from above. The switch drive 1 comprises a housing 2 in which a switch setting motor (not shown) is arranged, which drives a switch rod 3 extending out of the housing 2 for coupling to a track switch in the direction of the double arrow 4. The housing 2 further comprises a mounting plate 5, with which the switch drive 1 is fastened by means of fastening bolts 13 to a frame-like drive bearing, which comprises the frame components 8, 9, 10, 11 and 12. The drive bearing, in turn, is attached to the sleepers 15 by means of fastening bolts 14. In this embodiment, the piezoelectric sensor 6 is attached to the mounting plate 5, namely adjacent to the fastening bolts 13, in order to detect changes in the strain of the mounting plate 5 of the housing 2.

The invention claimed is:

1. A method for monitoring a track switch with a switch drive, the switch drive including a housing, a switch setting motor arranged in the housing, and a switch rod extending out of the housing for coupling to a track switch, the method comprising:
providing a piezoelectric sensor arranged on the housing;
detecting measurement signals of the piezoelectric sensor, periodic components of the measurement signal being at least partially filtered out in order to obtain signal components representative of a non-periodic change in a strain of the housing, the detection of the signal components representing the non-periodic changes of the strain comprising a determination of quasi-static parts of the sensor pickup; and
evaluating a temporal progression of the signal components representative of the non-periodic change in strain in order to identify deviations from a nominal state.

2. The method according to claim 1, wherein the measurement signals of the piezoelectric sensor are detected during a switching operation of the switch drive.

3. The method according to claim 1, wherein the piezoelectric sensor is arranged on an inner side of the housing.

4. The method according to claim 1, wherein the housing comprises a first housing component which at least partially surrounds the switch setting motor and a second housing component which is rigidly connected thereto and by which the switch drive is fastened to the track switch, and in that the piezoelectric sensor is arranged on the first housing component or on the second housing component.

5. The method according to claim 1, wherein the signal components representing the non-periodic change in strain are obtained by low-pass filtering, the low-pass filtering being carried out at a cutoff frequency at which periodic signal components of the piezoelectric sensor corresponding to a structure-borne sound are at least partially removed or attenuated.

6. The method according to claim 1, wherein the periodic signal components of the piezoelectric sensor comprise a frequency of greater than 100 Hz.

7. The method according to claim 1, wherein the signal components representing the non-periodic change in strain are amplified by a charge amplifier.

8. The method according to claim 1, wherein an amplitude of the temporal progression of the signal components representing the non-periodic change in strain is determined and compared with a setpoint value.

9. The method according to claim 1, wherein a measure of the rough-running of the switch is determined from the signal components representing the non-periodic change in strain.

10. The method according to claim 1, wherein the temporal progression of the signal components representing the non-periodic change in strain is recorded during a plurality of switching operations and a maintenance requirement of the switch is determined from a comparison of the recorded progressions.

11. The method according to claim 1, wherein signal components of the piezoelectric sensor representing structure-borne sound waves are additionally detected and evaluated.

12. The method according to claim 1, wherein measured temperature values of a temperature sensor are detected which are representative of the temperature of the housing in the region of the piezoelectric sensor, and in that the measured temperature values are used to compensate for temperature-dependent changes in the measurement signals of the piezoelectric sensor.

13. A switch drive comprising:
a housing;
a switch setting motor arranged in the housing;
a switch rod extending out of the housing for coupling to a track switch;
a piezoelectric sensor arranged on the housing; and
an evaluation unit to which the measurement signals of the piezoelectric sensor are fed, the evaluation unit configured to detect and record measurement signals of the piezoelectric sensor;
wherein periodic components of the measurement signal are at least partially filtered out to obtain signal components representative of a non-periodic change in the strain of the housing; and
wherein the evaluation unit is configured to detect the signal components representing the non-periodic change of the strain by determining the quasi-static parts of the sensor pickup, and the evaluation unit is configured to evaluate a temporal progression of the signal components representative of the non-periodic change in the strain to identify deviations from a nominal state.

14. The switch drive according to claim 13, wherein the measurement signals of the piezoelectric sensor are detected and recorded during a switching operation of the switch drive.

15. The switch drive according to claim 13, wherein the piezoelectric sensor is arranged on an inner side of the housing.

16. The switch drive according to claim 13, wherein:
the housing comprises a first housing component which at least partially surrounds the switch setting motor and a second, plate-like housing component which is rigidly connected thereto and by which the switch drive can be fastened to the track switch; and
the piezoelectric sensor is arranged on the first housing component or on the second housing component.

17. The switch drive according to claim 13, wherein a low-pass filter with a cutoff frequency is provided, at which periodic signal components of the piezoelectric sensor, corresponding to a structure-borne sound are at least partially removed or attenuated in order to obtain the signal components representing the non-periodic change in strain.

18. The switch drive according to claim 13, wherein the periodic signal components of the piezoelectric sensor comprise a frequency of greater than 100 Hz.

19. The switch drive according to claim 13, wherein a charge amplifier is provided which amplifies the signal components representing the non-periodic change in strain.

20. The switch drive according to claim 13, wherein the evaluation unit is configured to determine an amplitude of the temporal progression of the signal components representing the non-periodic change in strain and to compare it with a setpoint value.

21. The switch drive according to claim 13, wherein the evaluation unit is configured to determine a measure of the rough-running of the switch from the signal components representing the non-periodic change in strain.

22. The switch drive according to claim 13, wherein the evaluation unit is configured to record the temporal progression of the signal components representative of the non-periodic change in the strain during a plurality of switching operations and to determine a maintenance requirement of the switch from a comparison of the recorded progressions.

23. The switch drive according to claim 13, wherein the evaluation unit is configured to additionally detect and evaluate signal components of the piezoelectric sensor which represent structure-borne sound waves.

24. The switch drive according to claim 13, further comprising a temperature sensor configured to detect a temperature of the housing in a region of the piezoelectric sensor, measured temperature values from the temperature sensor being fed to the evaluation unit for compensating for temperature-dependent changes in the measurement signals of the piezoelectric sensor.

* * * * *

UNITED STATES PATENT AND TRADEMARK OFFICE
CERTIFICATE OF CORRECTION

| | | |
|---|---|---|
| PATENT NO. | : 12,415,554 B2 | Page 1 of 1 |
| APPLICATION NO. | : 19/113122 | |
| DATED | : September 16, 2025 | |
| INVENTOR(S) | : Robert Bernerstätter et al. | |

It is certified that error appears in the above-identified patent and that said Letters Patent is hereby corrected as shown below:

On the Title Page

Item (73), Assignees, please replace "VOESTALI ANALING AUSTRIA GMBH" with "VOESTALPINE SIGNALING AUSTRIA GMBH".

Signed and Sealed this
Fourteenth Day of October, 2025

John A. Squires
*Director of the United States Patent and Trademark Office*